United States Patent
Ubaru et al.

(10) Patent No.: US 11,379,758 B2
(45) Date of Patent: Jul. 5, 2022

(54) AUTOMATIC MULTILABEL CLASSIFICATION USING MACHINE LEARNING

(71) Applicants: International Business Machines Corporation, Armonk, NY (US); University of Massachusetts, Boston, MA (US)

(72) Inventors: Shashanka Ubaru, Ossining, NY (US); Sanjeeb Dash, Croton on Hudson, NY (US); Oktay Gunluk, New York, NY (US); Lior Horesh, North Salem, NY (US); Arya Mazumdar, Emeryville, CA (US)

(73) Assignees: INTERNATIONAL BUSINESS MACHINES CORPORATION, Armonk, NY (US); UNIVERSITY OF MASSACHUSETTS, Boston, MA (US)

( * ) Notice: Subject to any disclaimer, the term of this patent is extended or adjusted under 35 U.S.C. 154(b) by 461 days.

(21) Appl. No.: 16/706,037

(22) Filed: Dec. 6, 2019

(65) Prior Publication Data

US 2021/0174242 A1   Jun. 10, 2021

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
CPC ................................ G06N 5/04; G06N 20/00
See application file for complete search history.

(56) References Cited

U.S. PATENT DOCUMENTS

| 7,139,754 B2 | 11/2006 | Goutte |
| 8,055,593 B2 | 11/2011 | Rosales |
(Continued)

FOREIGN PATENT DOCUMENTS

| CN | 102364498 B | 11/2013 |
| CN | 103927394 B | 6/2017 |
(Continued)

OTHER PUBLICATIONS

Babbar et al., "Dismec: Distributed sparse machines for extreme multi-label classification". In Proceedings of the Tenth ACM International Conference on Web Search and Data Mining. Dec. 2015. pp. 721-729.

(Continued)

*Primary Examiner* — Rasheed Gidado
(74) *Attorney, Agent, or Firm* — Cantor Colburn LLP; Stosch Sabo

(57) ABSTRACT

A computer-implemented method for automatic multilabel classification includes receiving a label matrix Y for multiple training instances. The label matrix Y includes multiple labels, each label representing a respective category. The method further includes computing an intermediate matrix $YY^T$, where $Y^T$ is a transpose of the label matrix Y. The method further includes computing a basis matrix H by a non-negative matrix factorization of the intermediate matrix $YY^T$. The method further includes generating a group testing matrix A by sampling the basis matrix H. The method further includes generating, for each training instance from the training instances, a reduced label vector z by computing a product of the group testing matrix A and a label vector y for respective training instance from the label matrix Y. The method further includes predicting multiple labels associated with an input based on the reduced label vector z.

25 Claims, 8 Drawing Sheets

(56) References Cited

U.S. PATENT DOCUMENTS

| | | | |
|---|---|---|---|
| 8,086,549 B2 | 12/2011 | Qi | |
| 10,417,083 B2* | 9/2019 | Huang | G06N 5/003 |
| 10,621,509 B2* | 4/2020 | Kurata | G06F 16/355 |
| 2011/0078224 A1* | 3/2011 | Wilson | G10L 25/48 |
| | | | 708/401 |
| 2020/0210888 A1* | 7/2020 | Eldardiry | G06N 5/048 |

FOREIGN PATENT DOCUMENTS

| | | | |
|---|---|---|---|
| CN | 107577785 A | 1/2018 | |
| CN | 104809475 B | 5/2018 | |
| CN | 105069129 B | 5/2018 | |
| CN | 104915680 B | 6/2018 | |
| CN | 106126972 B | 10/2018 | |

OTHER PUBLICATIONS

Bhatia et al., "Sparse local embeddings for extreme multi-label classification". Proceedings of the 28th Annual Conference on Advances in Neural Information Processing Systems (NIPS), Dec. 2015. pp. 730-738.

Bi et al., "Efficient multi-label classification with many labels". In 30th International Conference on Machine Learning, Jun. 2013, pp. 405-413.

Jain et al., "Slice: Scalable linear extreme classifiers trained on 100 million labels for related searches". In Proceedings of the Twelfth ACM International Conference on Web Search and Data Mining, Feb. 2019., pp. 528-536.

Jasinska et al., "Extreme f-measure maximization using sparse probability estimates". Proceedings of the 33rd International Conference on Machine Learning Jun. 2016. 10 pages.

Liu et al., "Deep learning for extreme multi-label text classification". In Proceedings of the 40th International ACM SIGIR Conference on Research and Development in Information Retrieval, Aug. 2017, pp. 115-124.

Prabhu et al., "Extreme multi-label learning with label features for warm-start tagging, ranking & recommendation". In Proceedings of the Eleventh ACM International Conference on Web Search and Data Mining, Feb. 2018, pp. 441-449.

Wydmuch et al., "A no-regret generalization of hierarchical softmax to extreme multi-label classification". 32nd Conference on Neural Information Processing Systems. Dec. 2018. pp. 6355-6366.

Yen et al., "Ppdsparse: A parallel primal-dual sparse method for extreme classification". In Proceedings of the 23rd ACM SIGKDD International Conference on Knowledge Discovery and Data Mining, KDD, pp. 545-553. 2017.

Zhang et al., "Deep extreme multi-label learning". In Proceedings of the 2018 ACM on International Conference on Multimedia Retrieval, Jun. 2018, pp. 100-107.

* cited by examiner

AUTOMATIC MULTILABEL CLASSIFICATION USING MACHINE LEARNING

BACKGROUND

The present invention relates generally to computer technology, and more particularly to identifying multiple applicable categories for an input using machine learning system.

"Multilabel classification" refers to a simultaneous categorization of a given input into a set of multiple labels. The need for multi-label classification in large-scale learning systems is ever increasing. Examples include diverse applications such as music categorization, image and video annotation, text categorization, product categorization, webpage categorization, document categorization, natural language processing, medical applications, and the like. Detecting multiple semantic labels from images based on their low-level visual features and automatically classifying text documents into a number of topics based on their textual context are some of the typical multilabel applications. Generating advertisements based on webpage categorization can be another application of such a multilabel classification. There are several other applications of multilabel classification systems.

SUMMARY

According to one or more embodiments of the present invention, a computer-implemented method for automatic multilabel classification includes receiving, by a processor, a label matrix Y for multiple training instances. The label matrix Y includes multiple labels, each label representing a respective category. The method further includes computing, by the processor, an intermediate matrix $YY^T$, where $Y^T$ is a transpose of the label matrix Y. The method further includes computing, by the processor, a basis matrix H by a non-negative matrix factorization of the intermediate matrix $YY^T$. The method further includes generating, by the processor, a group testing matrix A by sampling the basis matrix H. The method further includes generating, by the processor, for each training instance from the training instances, a reduced label vector z by computing a product of the group testing matrix A and a label vector y for respective training instance from the label matrix Y. The method further includes predicting, by the processor, multiple labels associated with an input based on the reduced label vector z.

In one or more examples, the basis matrix is computed with a predetermined rank m. The predetermined rank m is computed as $k \cdot \log(d)$, wherein k is average sparsity of the label vector y and d is a number of labels in the label vector y. in one or more examples, predicting the multiple labels includes training m binary classifiers, m being number of entries in the reduced label vector z.

According to one or more embodiments of the present invention, generating the group testing matrix includes selection of one or more columns hi from the basis matrix H. The selection of the columns hi is based on a weight assigned to each column of the basis matrix H.

According to one or more embodiments of the present invention, the reduced label vector z is computed as $A \lor y$, where $\lor$ is a Boolean OR operation.

The above described features can also be provided at least by a system, a computer program product, and a machine.

According to one or more embodiments of the present invention, a computer-implemented method for automatic multilabel classification includes receiving, by a processor, a label vector y, which includes d labels. Each label represents a respective category. The method further includes computing, by the processor, a reduced label vector z from the label vector y. The reduced label vector z includes m labels, $m = k \cdot \log(d)$, where k is an average sparsity of the label vector y. The method further includes training, by the processor, m binary classifiers respectively corresponding to the m labels from the reduced label vector. Each binary classifier is trained to identify features associated with a corresponding label. The method further includes, in response to receiving an input, predicting, by the processor, multiple labels that are applicable to the input based on the m binary classifiers.

In one or more examples, computing the reduced label vector includes generating a group testing matrix A, and computing $z = A \lor y$, where $\lor$ is a Boolean OR operation. In one or more examples, generating the group testing matrix A includes computing, by the processor, an intermediate matrix $YY^T$, where $Y^T$ is a transpose of a label matrix Y, and where the label vector y is a row (or column) of Y. Further, a basis matrix H is computed by a non-negative matrix factorization of the intermediate matrix $YY^T$. Further yet, the processor generates the group testing matrix A by sampling the basis matrix H.

The above described features can also be provided at least by a system, a computer program product, and a machine.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
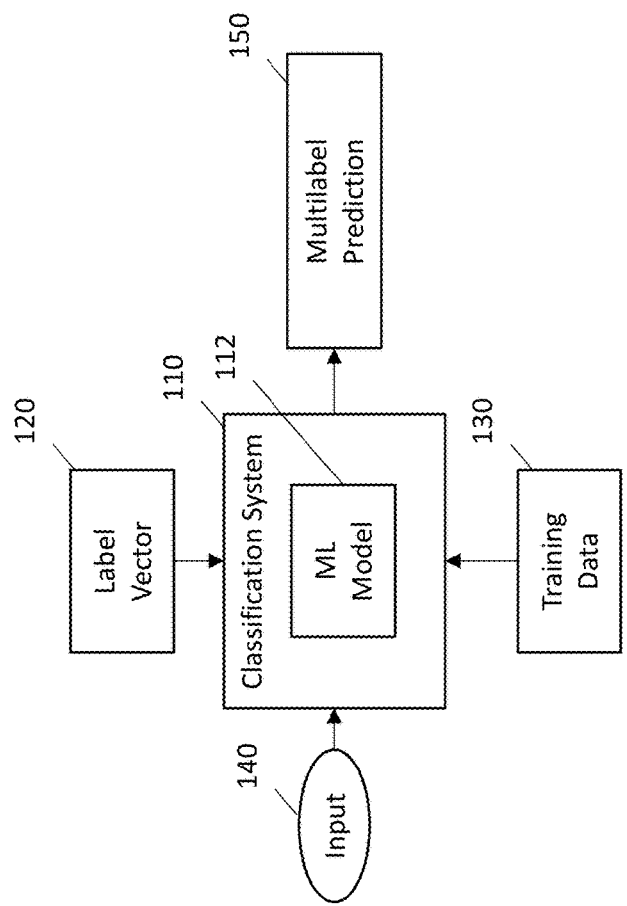
FIG. 1 depicts a block diagram of a classification system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

The multilabel classification problem can be expressed mathematically. Consider a set of labeled training data $\{(x_i, y_i)\}_{i=1}^n$, where $x_i \in \mathbb{R}^p$ are the input features for each data instance, and $y_i \in \{0,1\}^d$ are vectors indicating the corresponding labels (classes) to which the data instance belong to. The vector $y_i$ has a one (1) in the $j^{th}$ coordinate if the $i^{th}$ data point belongs to $j^{th}$ class. The technical problem is to learn (or model) a mapping (prediction rule) between the features and the labels, such that, a machine can automatically predict the class label vector y of a new data point x. Technical solutions to such multilabel classification problems can provide practical applications in various domains such as text mining, computer vision, music, and bioinformatics, among others.

The technical problem is further accentuated because applications can involve large number of labels. For example, with product categorization on e-commerce websites, advertisement generation based on webpage categorization, text and document categorization, and various other such applications, the label vectors $y_i$ are sparse (with average sparsity k<<d), i.e., each data point belongs to a few (average k out of d) classes. The multiclass classification is an instance of the multilabel classification, where all data points belong to only one of the d classes (k=1).

The simplest form of classification is binary classification problem, where d=2 and k=1 is well-studied, and several efficient algorithms exist. Accordingly, various existing techniques for solving the multiclass (d>2; k=1) classification problem attempt to reduce the problem into a set of binary classification problems, and then employ existing binary classifiers to solve the individual problems. Some existing techniques using this approach include, one-vs-all, all-pairs, and error-correcting output code (ECOC) methods, which are well documented. For example, In ECOC method, m-dimensional binary vectors (typically codewords from an error correcting code with m_d) are assigned to each class, and m binary classifiers are learned. For the $j^{th}$ classification, the $j^{th}$ coordinate of the corresponding codeword is used as the binary label for each class. In the modern applications, where d is typically very large (for example, $10^3$-$10^6$) this approach is found to be very efficient due to the reduction of the class dimension.

Further, various approaches to multiclass classification have been extended to the multilabel classification (MLC) problem. For example, in the ECOC technique, using codewords for each class is equivalent to multiplying the code matrix to the label vectors (since the label vectors are basis vectors). Hence, in the multilabel setting, the reduction from d dimensional label vectors to m dimensional can be achieved by multiplying a code matrix $A \in \mathbb{R}^{m \times d}$ to the label vector y. Accordingly, existing systems that use such one versus all (OvA) based classifiers require to train a binary classifier for each label independently. There are several approaches to optimize such solutions using, for example, a highly distributed and parallelized version of OvA, a primal-dual sparse method to a sparse optimization of OvA, a negative sampling and parallel implementation to scale OvA to millions of labels, and the like. Such techniques using OvA provide high prediction accuracy but suffer from high training and prediction runtimes.

Additionally, some existing systems for multilabel classification use tree based classifiers that exploit a hierarchical nature of labels when there is such a hierarchy. However, in such systems, high prediction accuracy is achieved only when labels have a hierarchical structure. Further, such systems tend to have high training times, because of the need to training several linear classifiers, each label typically corresponding to a single path from the root to a leaf.

Further yet, artificial neural network based techniques have also been used, particularly using deep neural networks for the multilabel classification. In such systems, along with high training and prediction costs, sizes of resulting models can be large (in Gigabytes).

Multilabel classification has also been approached using embedding methods, which reduce the effective number of labels. These embedding methods reduce the label dimension by projecting label vectors onto a low dimensional space, based on the assumption that the label matrix $Y=[y_1, \ldots, y_n]$ is low-rank, and computationally expensive for prediction. Here, $y_i$ is a label vector and is a row (or column) of the label matrix Y. State of the art embedding techniques first cluster the data into smaller regions, and then performs local embeddings of label vectors by preserving distances to nearest label vectors. However, such embedding based technical solutions are computationally expensive because they involve matrix decompositions/inversions, solving optimization problems, all of which can become impractical for values of d above a certain threshold depending on the type of computing system being used.

Embodiments of the present invention described herein address such technical problems and overcome shortcomings of existing techniques so as to facilitate applications even in domains that have a large number of labels (for example, $10^3$-$10^6$). Further, embodiments of the present invention facilitate scaling according to the number of labels and training instances, yet yielding accurate results. The embodiments of the present invention further are computationally efficient than the existing systems by taking into account that the label vectors are sparse $\|y_i\|_0=k<<d$. Accordingly, data points belong to very few classes.

Embodiments of the present invention provide additional advantages by facilitating learning (modeling) of grouping from training data. The computational efficiency facilitates embodiments of the present invention to be provably faster (sublinear) in providing predictions compared to other existing techniques. The embodiments of the present invention further provide an improved precision. Techniques described herein further facilitate embodiments of the present invention to learn from less training data. Further yet, in one or more embodiments of the present invention, predictions can be provided at real time. Additional advantages of the technical solutions provided by embodiments of the present invention will be evident to a person skilled in the art.

FIG. 1 depicts a block diagram of a classification system according to one or more embodiments of the present invention. Here the classification system 110 is trained using a training data 130 to determine a mapping, or a machine learning model 112, between features inputs elements and a label vector 120. The label vector 120 includes the various categories, i.e. the labels, into which the classification system 110 can classify an input element 140. The training data 130 includes multiple sample inputs that are annotated using corresponding labels from the label vector 120.

Once the machine learning model 112 is trained, the classification system 110 can receive unknown inputs 140 and provide corresponding multilabel prediction 150. Here the input 140 is "unknown" because the input 140 can be an input element that is not included in the training data 130. Further, the input 140 does not provide any annotations about the labels from the label vector 120 that can (or cannot) apply to the input 140. The multilabel prediction 150 that the classification system 110 provides identifies the one or more labels from the label vector 120 that are applicable to the input 140.

Figure 2:
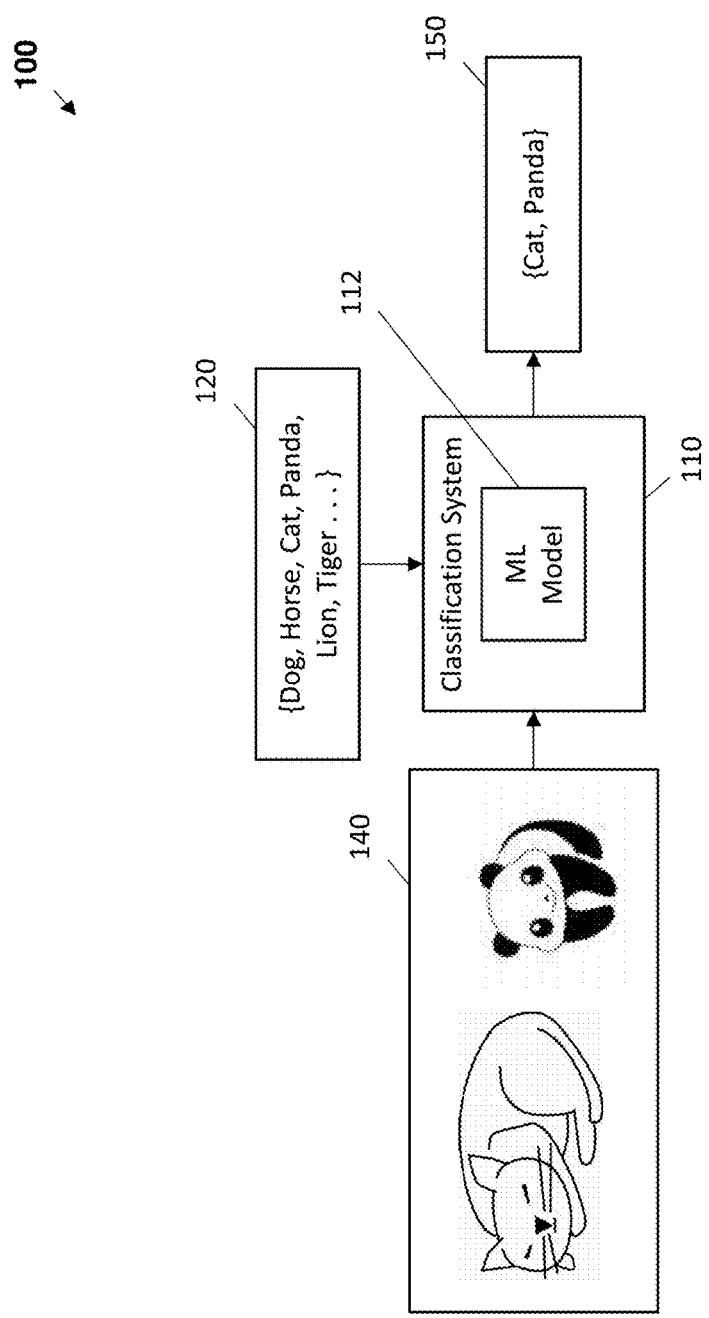
FIG. 2 depicts an example scenario of using a multilabel classification according to one or more embodiments of the present invention.

FIG. 2 depicts an example scenario of using a multilabel classification according to one or more embodiments of the present invention. Here, the machine learning model 112 of the classification system 110 is trained to identify contents of an image file that is input 140. The label vector 120 here is a list of animals that can be identified in the image. In this particular example scenario the input 140 is categorized according to one or more animals detected in the image that is input 140. As can be seen here the input image 140 is categorized into multiple categories—cat and panda—as per the multilabel prediction 150 that is output by the classification system 110. It is understood that in other embodiments of the present invention, the domain of data that is being classified, the label vector, the input, can each be different from the example above.

Figure 3:
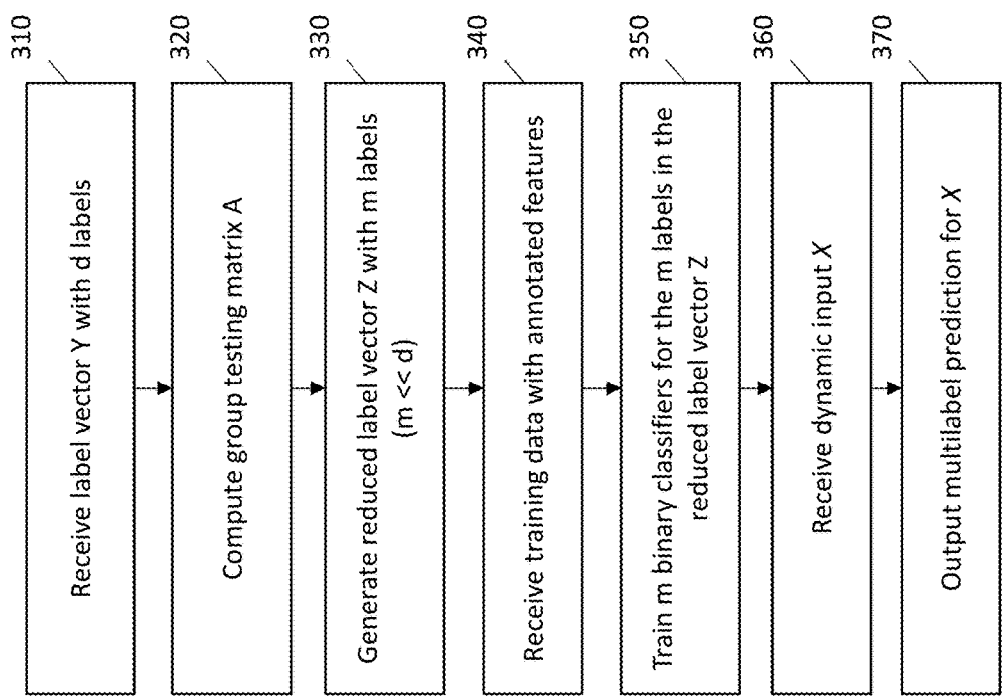
FIG. 3 depicts a flowchart of a method for multilabel classification according to one or more embodiments of the present invention.

FIG. 3 depicts a flowchart of a method for multilabel classification according to one or more embodiments of the present invention. The depicted method 300 includes receiving a label vector y with d labels, at block 310. Each of the d labels in y is a unique category, and multiple of these categories can be applicable to an input element 140 that the multilabel classification system 100 receives. The label vector y can include $10^3$ or more labels in an embodiment. For example, the label vector y can be a list of genes, molecules, words, topics, product-categories, webpage-categories, advertisement-categories, people, or any other type of classes that a user may desire to categorize data into. In one or more embodiments of the present invention, the system receives a label matrix Y that includes multiple label vectors y, where each label vector corresponds to a particular training instance. In this manner, the label matrix Y facilitates the system to be trained for multiple training instances.

The method 300 further includes computing a group testing matrix A using the label vector y, at block 320. The group testing matrix A is computed using a data dependent technique that is computationally efficient. The data dependent construction of the group testing matrix facilitates similar categories from the label vector y to appear in the same group more often than not.

In a group testing problem, the goal is to efficiently identify a small number (say k) of defective elements in a population of large size (here, d). For this, the items in groups are tested with the premise that majority of the tests will return negative results, clearing the entire group. Only few m<<d tests are needed to detect the k defectives. The items can be grouped in either an adaptive or nonadaptive fashion. In the nonadaptive group testing scheme, the grouping for each test can be described using an m×d binary (0/1 entries) matrix A.

Embodiments of the present invention solve the MLC problem using the group testing (GT) premise. That is, the problem of estimating the classes of a data instance from a large set of classes, is similar to identifying a small set of items from a large set. Accordingly, the group testing binary matrix A can be used to reduce the label vector y to a smaller binary vector z using an operation such as the Boolean OR operation $z = A \vee y$ (described later), at block 330.

Figure 4:
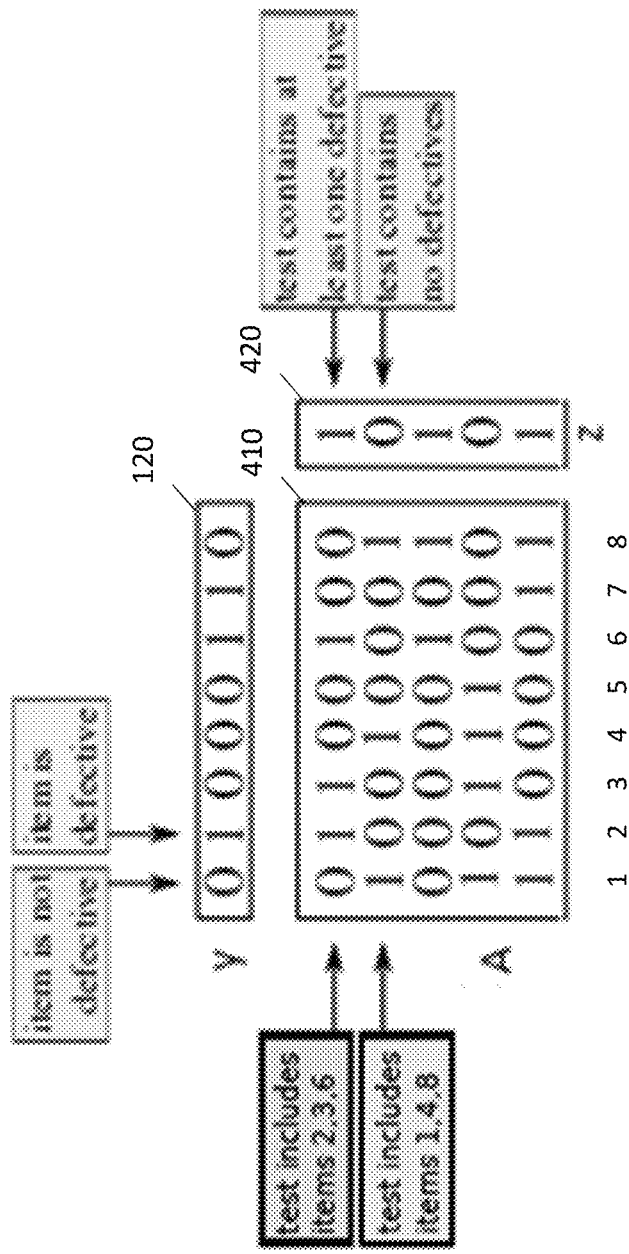
FIG. 4 provides a visual depiction of using group testing to solve multilabel classification problem according to one or more embodiments of the present invention.

FIG. 4 provides a visual depiction of using group testing to solve multilabel classification problem according to one or more embodiments of the present invention. An instance of the received label vector y is represented where label numbers 2, 6, and 7 from the d=8 count label vector is being mapped with one of the groups $Z_i$ from the reduced label vector z. Here, each row in the group testing matrix A 410 is populated such that $A_{ij}=1$ if the $i^{th}$ item is applicable for the $j^{th}$ label. Here, i represents row number and j represents column number.

The reduced label vector z 420 is then calculated from the y 120 and the A 410 as a Boolean OR of each row $A_i$ from A 410, and y 120. The Boolean OR operation $Z = A \vee y$ can be obtained in one or more embodiments of the present invention by setting every nonzero entry of the matrix-vector product Ay to 1 (and leaving the zero entries as they are). It can also be computed as coordinate-wise Boolean OR of the columns of A 410 that correspond to the nonzero entries of y 120, in one or more embodiments of the present invention. It should be noted that here A 410 is a k-disjunct matrix that facilitates a group testing scheme that identifies the labels for a k-sparse label vector y exactly. Generating the group testing matrix A 410 is described in detail further.

Referring to the flowchart for method 300, subsequently, a set of m binary classifiers are trained for the labels in z, a classifier $w_i$ for each group of labels $Z_i$ in Z using received training data, at blocks 340 and 350. The training data 130 can include annotated input elements. The annotations identify the various labels that are associated with the input elements in the training data. The training data 130 is used to train a machine learning model, such as using an artificial neural network, or any other machine learning technique to determine a mapping between features of the input elements and the expected results.

Table 1 provides an algorithm for training the m binary classifiers according to one or more embodiments of the present invention, which can be described as follows. Suppose that the training data 130 includes n training instances $\{(x_i, y_i)\}_{i=1}^n$, where $x_i \in \mathbb{R}^p$ are the input features for each data instance, and $y_i \in \{0,1\}^d$ are vectors indicating the corresponding labels. As per one or more embodiments of the present invention, each data instance belongs to at most k classes because the label vector y is k-sparse. Given the k-disjunct matrix $A \in \mathbb{R}^{m \times d}$ the reduced measured (label) vectors $Z_i$ is computed for each label vector $y_i$, $i=1, \ldots, n$ using the Boolean OR operation. The m binary classifiers $\{w_j\}_{j=1}^m$ are trained based on $\{(x_i, z_i)\}_{i=1}^n$ with $j^{th}$ entry of $Z_i$ indicating which class (1/0) the $i^{th}$ instance belongs to for the $j^{th}$ classifier.

TABLE 1

Input: Training data $\{(x_i, y_i)\}_{i=1}^n$, group testing matrix
$A \in \mathbb{R}^{m \times d}$, a binary classifier alogrithm $\mathcal{C}$.
Output: m vclassifiers $\{w_j\}_{j=1}^m$.
for i = 1, . . . , n. do
   $z_i = A \vee y_i$.
end for
for j = 1, . . . , m. do
   $w_j = \mathcal{C}(\{(x_i, z_{ij})\}_{i=1}^n)$.
end for The $i^{th}$ binary classifiers can, as a result of the training, identify whether an input element belongs to the group of labels $Z_i$ or not. In other words, the m classifiers learn to test whether an input data belongs to the corresponding group (of labels) $Z_i$ or not. Accordingly, upon receiving an input X, the multilabel classification system 100 can output a multilabel prediction, at block 360 and 370. The multilabel prediction that is output identifies one or more groups from Z that are applicable to the input element X In one or more embodiments of the present invention, during prediction, the label vector y can be recovered from the predictions of the classifiers using an inexpensive algorithm (requiring no matrix inversion or solving optimization algorithms). Accordingly, embodiments of the present invention have a low prediction cost, as is desirable in real time applications. The method 300 uses only m=O(k log d) groups/classifiers, as against d classifiers in existing techniques. Accordingly, technical solutions facilitated by embodiments of the present invention facilitate fast training. Further, the prediction is provided in linear time.

Table 2 provides an algorithm for the prediction according to one or more embodiments of the present invention. In the prediction stage, given an input data (or a test data), $x \in \mathbb{R}^p$, the m binary classifiers $\{w_j\}_{j=1}^m$ can be used to obtain a predicted reduced label vector $\hat{Z}$ for the input data. As noted earlier, the k sparse label vector y 120 can be recovered exactly, if the group testing matrix A 410 is a k-disjunct matrix. In a matrix M that is k-disjunct the Boolean sum of every k columns does not contain any other column in the matrix M. With a (k; e)-disjunct matrix, $e \geq 1$, the classification system 100 can recover the k sparse label vector exactly, even if [e/2] binary classifiers misclassify, using the decoder technique described herein. The matrix M is $k^e$ disjunct if for any k+1 columns of M, there are at least e+1 elements 1 in $M'_0 - \cup_{i=1}^k M'_i$.

The decoder used herein operates such that given a predicted reduced label vector $\hat{Z}$ 420, and the group testing matrix A 410, set the coordinate position of $\hat{Y}$ corresponding to $l=[1, \ldots, d]$ to 1 if and only if $|supp(A^{(l)}) \backslash supp(\hat{Z})| < e/2$. That is, the classification system 100 sets the $l^{th}$ coordinate of $\hat{y}$ to 1, if the number of coordinates that are in the support of the corresponding column $A^{(l)}$ but are not in the predicted reduced vector $\hat{Z}$, is less than e/2. The decoder returns the exact label vector even if up to e/2 binary classifiers make errors.

TABLE 2

Input: Test data $x \in \mathbb{R}^p$, the GT matrix
$A \in \mathbb{R}^{m \times n}$ which is (k, e)-disjunct (e $\geq$ 1),
m classifiers $\{w_j\}_{j=1}^m$.
Output: predicted label $\hat{y}$.
Compute $\hat{z} = [w_1(x), \ldots, w_m(x)]$.
Set $\hat{y} \leftarrow 0$.
  for i = 1, . . . , n do
    if $|supp(A^{(i)}) \backslash supp(\hat{z})| < e/2$ then
      $\hat{y}_i = 1$.
    end if
  end for It should be noted that the prediction algorithm is computationally inexpensive (does not require matrix inversion or solving optimization). It is equivalent to an AND operation between a binary sparse matrix and a binary (likely sparse) vector, which costs less than a sparse matrix vector product $O(nnz(A)) \approx O(kd)$, where nnz(A) is the number of nonzero entries of A 410. Accordingly, the multilabel classification system 100 can output the multilabel prediction for categorizing the provided input 140 into one or more categories according to the label vector y 120.

Figure 5:
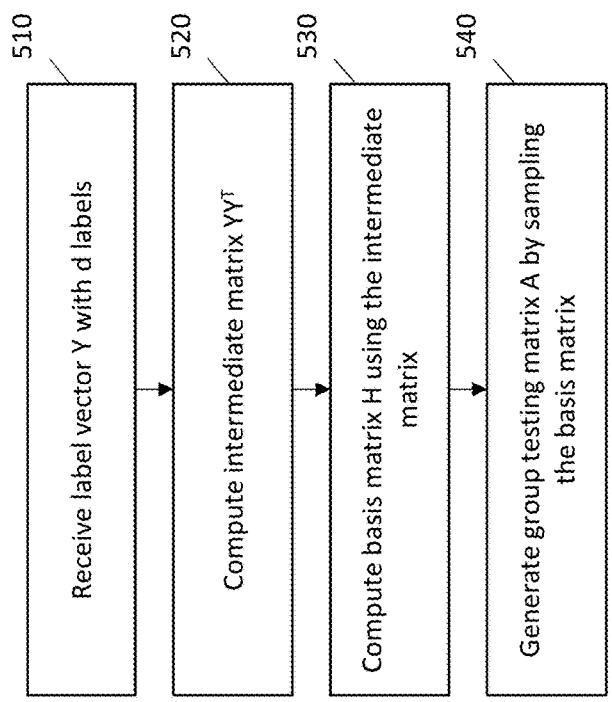
FIG. 5 depicts a flowchart of a method for generating a group testing matrix according to one or more embodiments of the present invention.

FIG. 5 depicts a flowchart of a method 500 for generating the group testing matrix A 410 according to one or more embodiments of the present invention. The method 500 includes receiving the label vector y 120, at block 510. The method further includes computing an intermediate matrix $YY^T$ using the label matrix Y 120, at block 520. Here, $Y^T$ is the transpose of the label matrix Y.

The classification system 100 further computes a basis matrix H of a predetermined rank using symmetric nonnegative matrix factorization, or any other such technique, at block 530. The predetermined rank is configured to be $m=k \cdot \log(d)$. The basis matrix H is computed such that $-YY^T \approx H^T H$.

Further, the method 500 includes generating the group testing matrix A 410 using the basis matrix H by sampling the columns $h_i$ of the basis matrix H, at block 540. In one or more embodiments of the present invention, the sampling is performed based on weights assigned to each column $h_i$. For example, for column sparsity c, each column is first scaled as $\tilde{h}_i = c \cdot \bar{h}_i$, and then, $\tilde{h}_i$ is reweighted to avoid entries >1. Here, $\bar{h}_i$ represents the $i^{th}$ column of the basis matrix H, and $\tilde{h}_i$ represents a calculated column by multiplying the original column with the assigned weight c.

Prediction of new label from the group testing matrix A 410 can be expressed mathematically as follows. Consider $b = A^T Z = A^T(A \vee Y)$. For any $j \in supp(y)$, $\mathbb{E}[b_j] = c$, whereas for any $j \notin supp(y)$, $\mathbb{E}[b_j] \leq \Sigma_{i=1}^m \exp(-\langle Y, \tilde{h}_i \rangle)$, where $\tilde{h}_i$ is the $i^{th}$ row of H.

Accordingly, using the method 300 (FIG. 3) with the group testing matrix A 410 as generated by the method 500 (FIG. 5), the classification system 100 can output a multilabel prediction in log time. Accordingly, in one or more embodiments of the present invention, the classification system 100 can provide the multilabel prediction in real time. Further, the training of the classification data 100 using the technical solutions described herein can be performed using lesser amount of labeled data compared to the training required for existing systems because of the reduced number of binary classifiers.

Using several different training datasets, embodiments of the present invention, have provided results that are more efficient than existing systems. Embodiments of the present invention accordingly provide an improvement to computing technology, particularly systems to implement multilabel classification of large amounts of data into a large number of categories (labels). Further, embodiments of the present invention provide practical applications where the input data is automatically classified using multilabel prediction using machine learning. It should be noted that the multilabel classification is impractical for humans to perform without using a machine that implements the multilabel classification given the amount of data that has to be classified in this manner in the various domains where multilabel classification is used as described herein.

Embodiments of the present invention facilitate using a computing device to classify multiple labels of input features. According to one or more embodiments of the present invention, a method implemented by the computing device includes receiving, by the computing device, labeled training data. The labeled training data has input features and label vectors indicating classifications for the labeled training data. The method further includes dividing the labeled training data into one or more testing groups based upon the label vectors. The method further includes testing each of the one or more testing groups to determine whether the label vectors associated with the testing group are correct. Further, the method includes learning a mapping between the input features and the label vectors indicating one or more classifications for the labeled training data based, at least in-part, upon whether the label vectors associated the testing group are correct. In one or more examples, the label vectors indicate one or more classifications for the labeled training data label less than twenty percent of the labeled training data.

Embodiments of the present invention uses a nonnegative matrix factorization (NMF), and a sampling technique to generate a group testing matrix. Further, the group testing matrix facilitates a label reduction. The reduced labels (log of provided labels) are then used to train a reduced number of binary classifiers, which are then used for generating a multilabel prediction for an input data. Accordingly, the technical solutions provided by embodiments of the present invention are computationally efficient compared to existing solutions.

Figure 6:
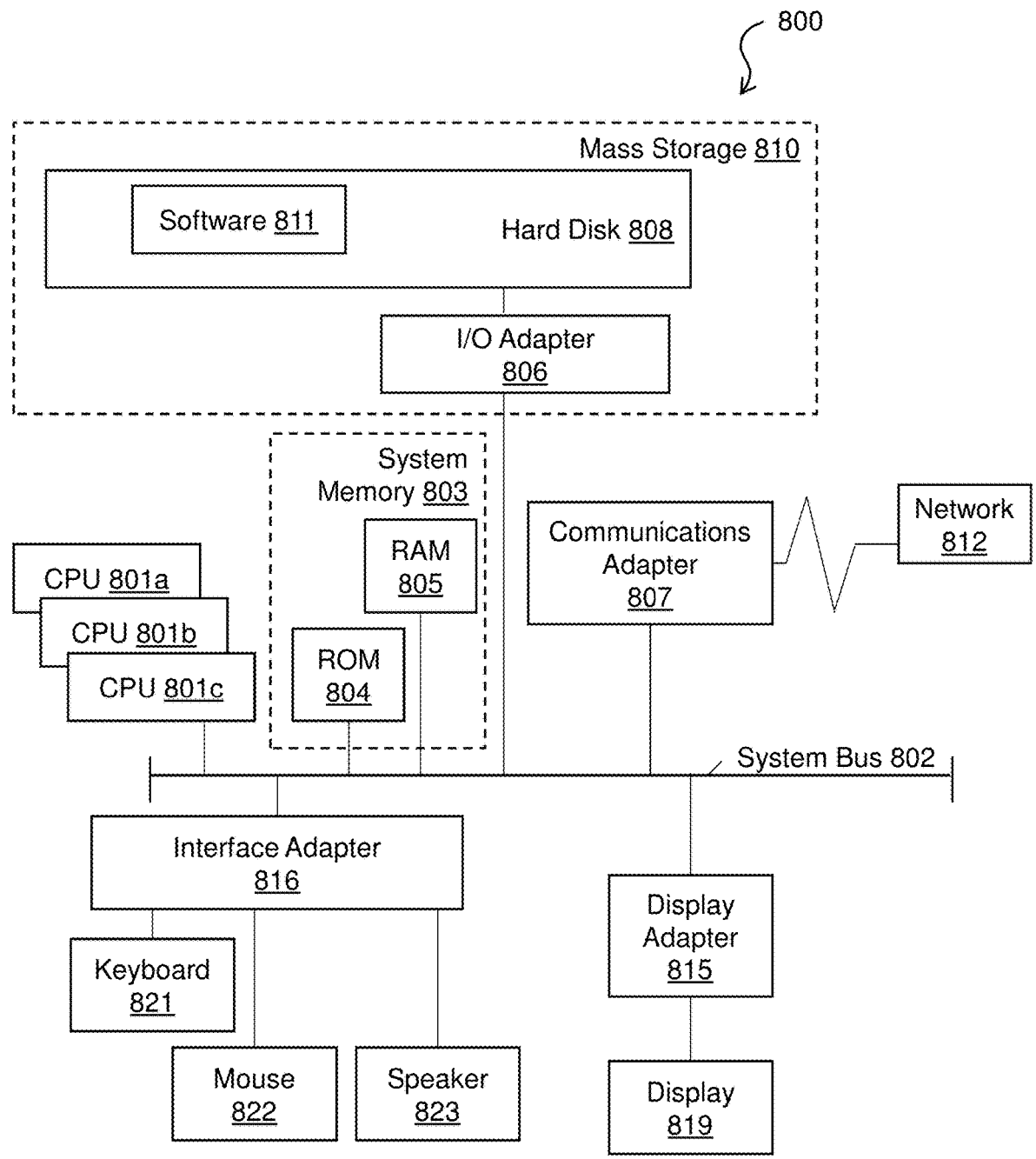
FIG. 6 depicts a computer system according to one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the present invention can be implemented using cloud computing technology in one or more examples. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
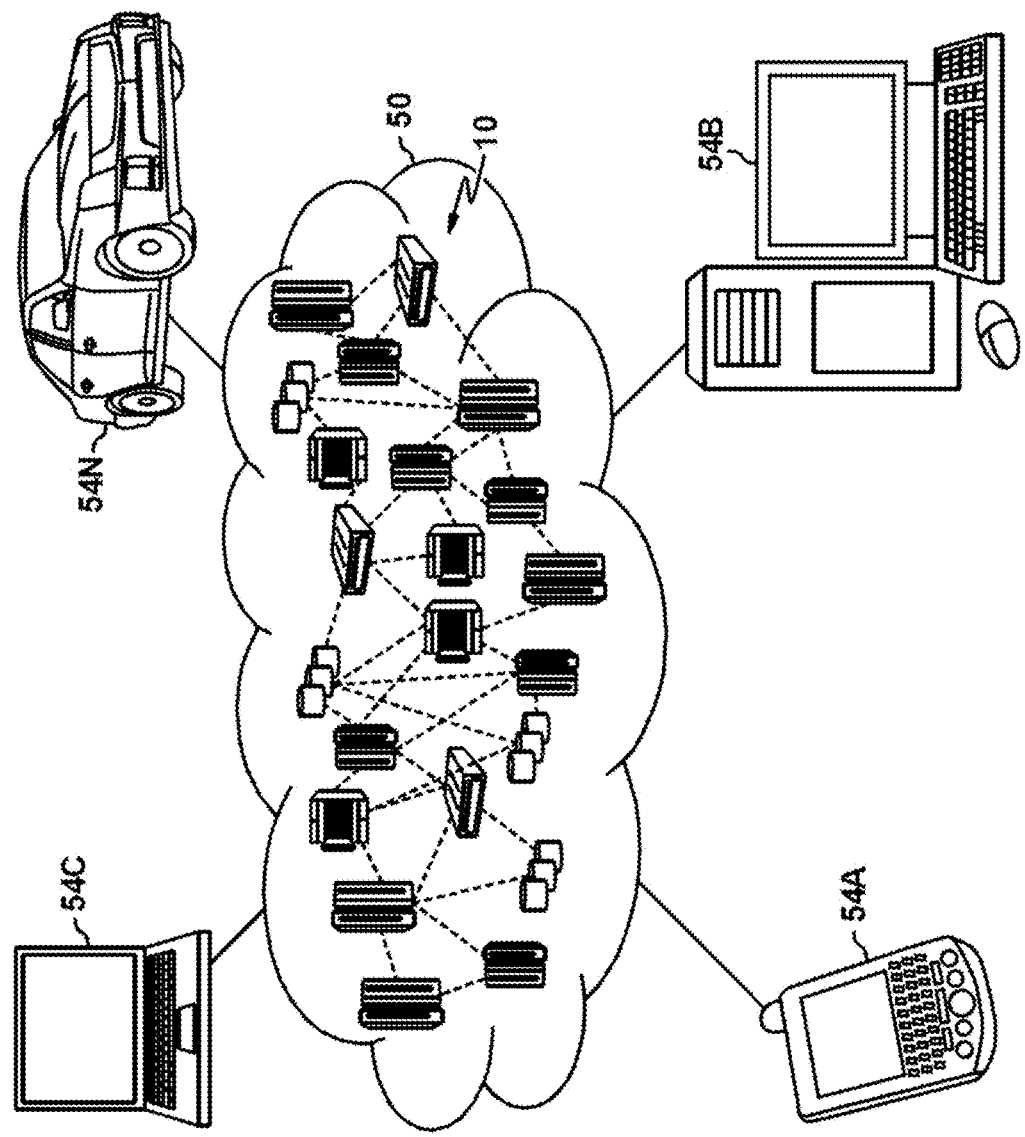
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
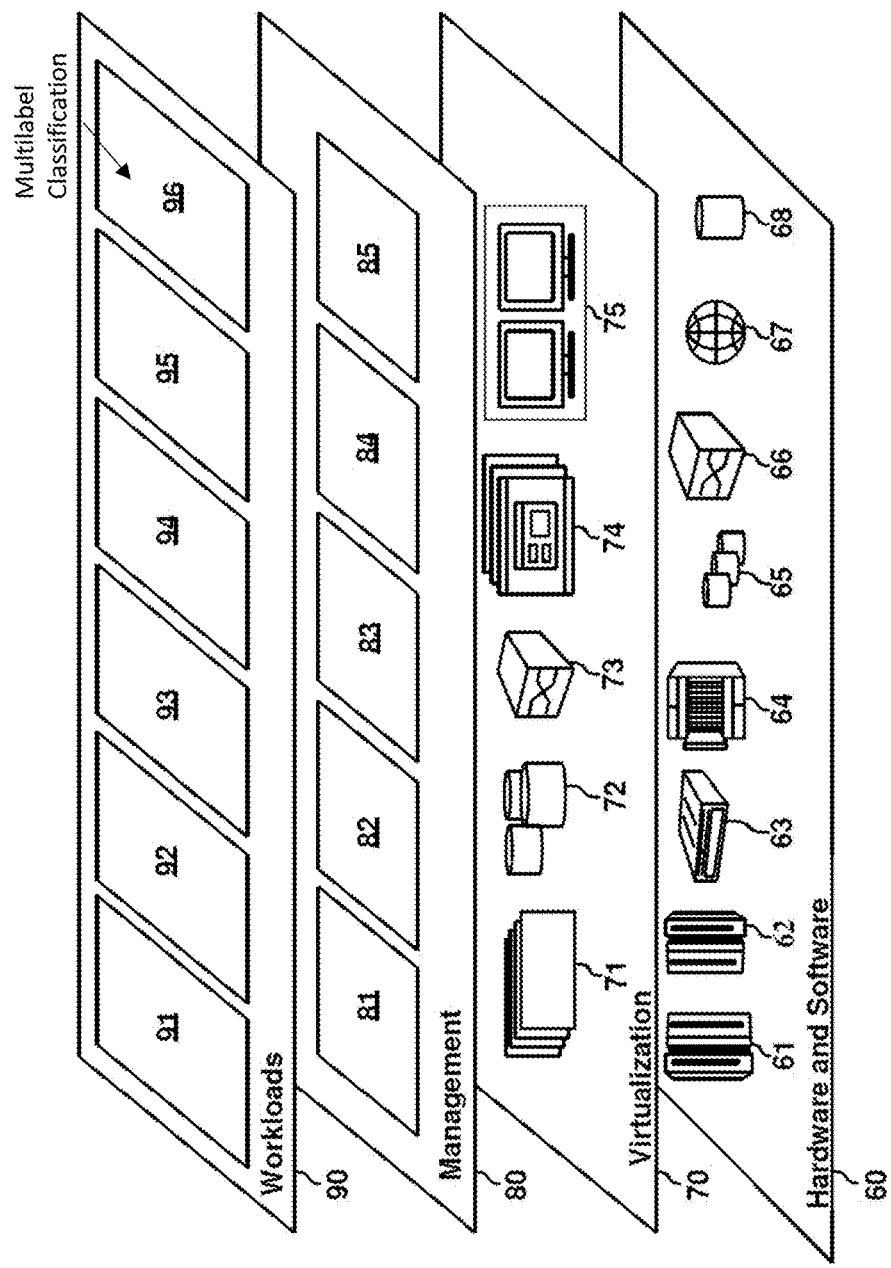
FIG. 8 depicts model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multilabel classification 96.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for automatic multi-label classification, the computer-implemented method comprising:

receiving, by a processor, a label matrix Y for a plurality of training instances, the label matrix Y comprising a plurality of labels, each label representing a respective category;

computing, by the processor, an intermediate matrix $YY^T$, where $Y^T$ is a transpose of the label matrix Y;

computing, by the processor, a basis matrix H by a non-negative matrix factorization of the intermediate matrix $YY^T$;

generating, by the processor, a group testing matrix A by sampling the basis matrix H;

generating, by the processor, for each training instance from the plurality of training instances, a reduced label vector z by computing a product of the group testing matrix A and a label vector y for respective training instance from the label matrix Y and predicting, by the processor, multiple labels associated with an input based on the reduced label vector z.

2. The computer-implemented method of claim 1, wherein, the basis matrix is computed with a predetermined rank m.

3. The computer-implemented method of claim 2, wherein the predetermined rank m is computed as k·log(d), wherein k is average sparsity of the label vector y and d is a number of labels in the label vector y.

4. The computer-implemented method of claim 2, wherein predicting the multiple labels comprises training m binary classifiers, m being number of entries in the reduced label vector z.

5. The computer-implemented method of claim 1, wherein generating the group testing matrix comprises selection of one or more columns $h_i$ from the basis matrix H.

6. The computer-implemented method of claim 5, wherein the selection of the columns $h_i$ is based on a weight assigned to each column of the basis matrix H.

7. The computer-implemented method of claim 1, wherein the reduced label vector z is computed as A$\vee$y, where $\vee$ is a Boolean OR operation.

8. A system comprising:
a memory; and
a processor coupled with the memory, the processor is configured to perform a method for automatic multilabel classification, the method comprising:
receiving a label vector y comprising a plurality of labels, each label representing a respective category;
computing an intermediate matrix $yy^T$, where $y^T$ is a transpose of the label vector y;
computing a basis matrix H by a non-negative matrix factorization of the intermediate matrix $yy^T$;
generating a group testing matrix A by sampling the basis matrix H;
generating a reduced label vector z by computing a product of the group testing matrix A and the label vector y; and
predicting multiple labels associated with an input based on the reduced label vector z.

9. The system of claim 8, wherein, the basis matrix is computed with a predetermined rank m.

10. The system of claim 9, wherein the predetermined rank m is computed as k·log(d), wherein k is average sparsity of the label vector y, and d is a number of labels in the label vector y.

11. The system of claim 9, wherein predicting the multiple labels comprises training m binary classifiers, m being number of entries in the reduced label vector z.

12. The system of claim 8, wherein generating the group testing matrix comprises selection of one or more columns $h_i$ from the basis matrix H.

13. The system of claim 12, wherein the selection of the columns h is based on a weight assigned to each column of the basis matrix H.

14. The system of claim 8, wherein the reduced label vector z is computed as A$\vee$y, where $\vee$ is a Boolean OR operation.

15. A computer program product comprising a computer-readable storage medium having program instructions embodied therewith, the program instructions when executed by a processor cause the processor to perform a method for automatic multilabel classification, the method comprising:
receiving a label vector y comprising a plurality of labels, each label representing a respective category;
computing an intermediate matrix $yy^T$, where $y^T$ is a transpose of the label vector y;
computing a basis matrix H by a non-negative matrix factorization of the intermediate matrix $yy^T$;
generating a group testing matrix A by sampling the basis matrix H;
generating a reduced label vector z by computing a product of the group testing matrix A and the label vector y; and
predicting multiple labels associated with an input based on the reduced label vector z.

16. The computer program product of claim 15, wherein, the basis matrix is computed with a predetermined rank m.

17. The computer program product of claim 16, wherein the predetermined rank m is computed as k·log(d), wherein k is average sparsity of the label vector y, and d is a number of labels in the label vector y.

18. The computer program product of claim 16, wherein predicting the multiple labels comprises training m binary classifiers, m being number of entries in the reduced label vector z.

19. The computer program product of claim 15, wherein generating the group testing matrix comprises selection of one or more columns $h_i$ from the basis matrix H.

20. The computer program product of claim 12, wherein the selection of the columns $h_i$ is based on a weight assigned to each column of the basis matrix H.

21. A computer-implemented method for automatic multilabel classification, the computer-implemented method comprising:
receiving, by a processor, a label vector y, which comprises d labels, each label representing a respective category;
computing, by the processor, a reduced label vector z from the label vector y, the reduced label vector z comprises m labels, m=k·log(d), where k is an average sparsity of the label vector y;
training, by the processor, a plurality of m binary classifiers respectively corresponding to the m labels from the reduced label vector, each binary classifier is trained to identify features associated with a corresponding label; and
in response to receiving an input, predicting, by the processor, multiple labels that are applicable to the input based on the m binary classifiers.

22. The computer-implemented method of claim 21, wherein computing the reduced label vector comprises:
generating a group testing matrix A; and
computing z=A$\vee$y, where $\vee$ is a Boolean OR operation.

23. The computer-implemented method of claim 22, wherein generating the group testing matrix A comprises:
computing, by the processor, an intermediate matrix $yy^T$, where $y^T$ is a transpose of the label vector y;
computing, by the processor, a basis matrix H by a non-negative matrix factorization of the intermediate matrix $yy^T$;
generating, by the processor, a group testing matrix A by sampling the basis matrix H.

24. A system comprising:
a memory; and
a processor coupled with the memory, the processor configured to perform a method comprising:
receiving a label vector y, which comprises d labels, each label representing a respective category;
computing a reduced label vector z from the label vector y, the reduced label vector z comprises m labels, m=k·log(d), where k is an average sparsity of the label vector y;
training a plurality of m binary classifiers respectively corresponding to the m labels from the reduced label vector, each binary classifier is trained to identify features associated with a corresponding label; and
in response to receiving an input, predicting multiple labels that are applicable to the input based on the m binary classifiers.

25. The system of claim 24, wherein computing the reduced label vector comprises:

generating a group testing matrix A; and computing $z = A \vee y$, where $\vee$ is a Boolean OR operation.

* * * * *